US005658520A

United States Patent [19]

Hards

[11] Patent Number: 5,658,520
[45] Date of Patent: Aug. 19, 1997

[54] METHODS OF FORMING OBJECTS BY DEPOSITING FLOWABLE MATERIAL

[76] Inventor: John E. Hards, 4980 Pinetree Crescent, West Vancouver, British Columbia, Canada, V7W 3A3

[21] Appl. No.: 515,835

[22] Filed: Aug. 16, 1995

[51] Int. Cl.⁶ .............................. B29C 41/02; B29C 41/20
[52] U.S. Cl. .................... 264/279.1; 264/308; 264/313; 264/317
[58] Field of Search ............................ 264/279.1, 308, 264/313, 317

[56] References Cited

U.S. PATENT DOCUMENTS

| | | | |
|---|---|---|---|
| 4,710,332 | 12/1987 | Rosman | 264/308 X |
| 5,088,047 | 2/1992 | Bynum | 364/474.24 |
| 5,121,329 | 6/1992 | Crump | 364/468.26 |
| 5,134,569 | 7/1992 | Masters | 364/474.24 |
| 5,140,937 | 8/1992 | Yamane et al. | 118/695 |
| 5,216,616 | 6/1993 | Masters | 264/401 |
| 5,260,009 | 11/1993 | Penn | 264/401 |
| 5,303,141 | 4/1994 | Batchelder et al. | 364/149 |

*Primary Examiner*—Leo B. Tentoni
*Attorney, Agent, or Firm*—Long and Cameron

[57] ABSTRACT

A method of forming an object includes depositing a flowable material onto an area of forming surface and allowing the deposited material to at least partially harden on the forming surface to form a portion of the object, and then displacing the forming surface relative to the portion so as to expose at least a part of the area. Further material is then deposited onto the exposed area and above steps are repeated until the object has been formed.

20 Claims, 6 Drawing Sheets

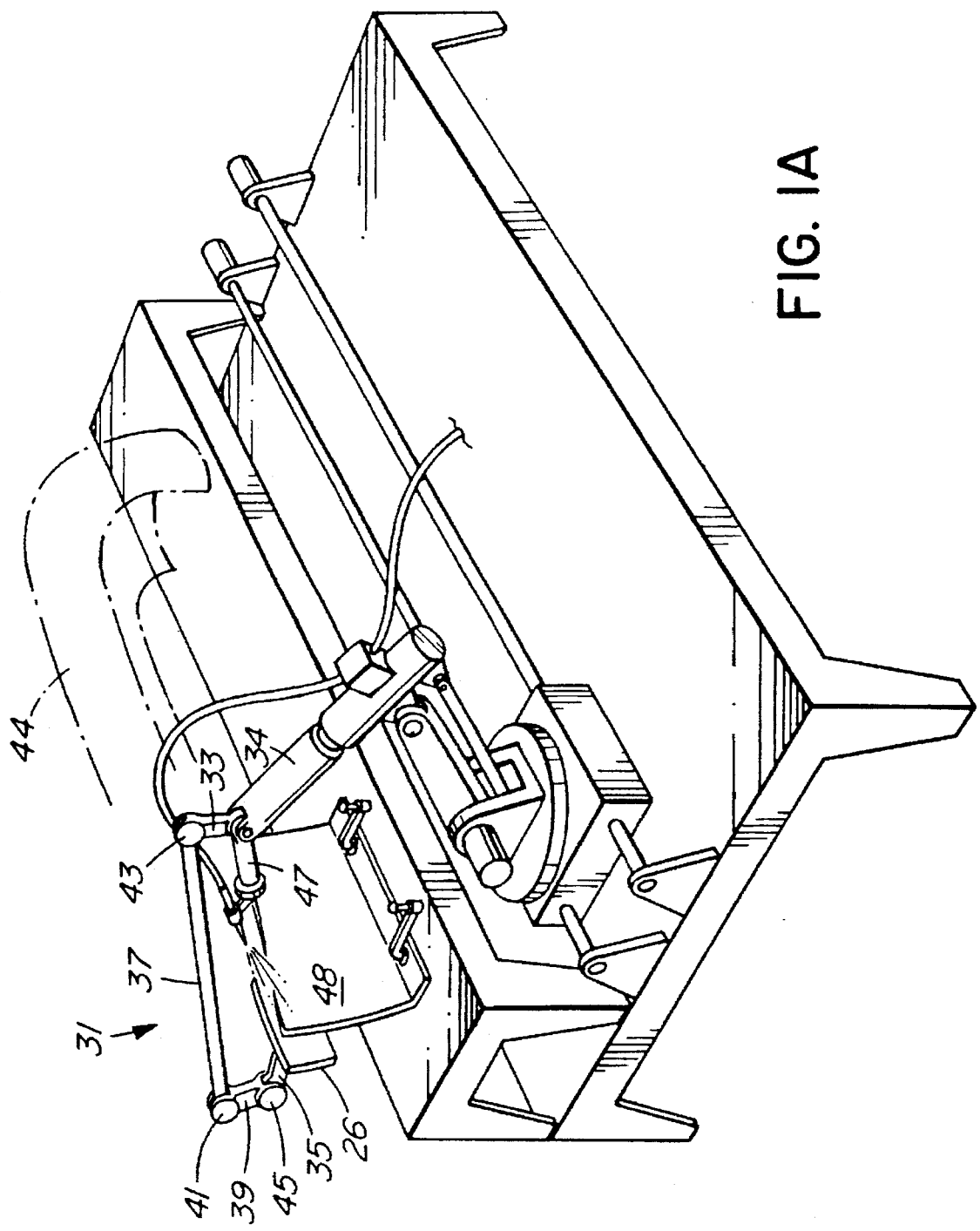

METHODS OF FORMING OBJECTS BY DEPOSITING FLOWABLE MATERIAL

BACKGROUND OF THE INVENTION

1. Field of the Invention

The present invention relates to methods of forming objects by depositing a hardenable flowable material, for example by spraying or extruding the material, onto a forming surface, and causing the deposited material to harden to form a portion of the object.

2. Description of the Related Art

In U.S. Pat. No. 5,140,937, issued Aug. 25, 1992 to Mitsuo Yamane et al., there is disclosed an apparatus and a method for forming a three dimensional article which employs ink jet heads for jetting a thermosetting resin onto a forming stage. X and Y axis controlled devices are employed to control the movement of the ink jet heads in the X and Y-axis directions, and a Z-axis control device controls movement of the forming stage in the Z-axis direction.

U.S. Pat. No. 5,134,569, issued Jul. 29, 1992 to William E. Masters, teaches the use of a dispensing head for extruding a continuous strand of fluent material onto a base. The dispensing head and the base are indexed so that the material forms a desired cross-sectional profile and, thus, a three-dimensional object.

U.S. Pat. No. 5,121,329, issued Jun. 9, 1992 to S. Scott Crump, discloses an apparatus incorporating a movable dispensing head provided with a supply of material which solidifies at a pre-determined temperature, and a base member, which are moved relative to one another along X, Y and Z axes in a pre-determined pattern to create three-dimensional objects by building up material discharged from the dispensing head onto the base member at a controlled rate.

Further methods and apparatuses for forming an object by dispensing a fluent material onto a support, the material then hardening to form the object, are disclosed, for example, in U.S. Pat. Nos. 5,260,009, issued Nov. 9, 1993 to Steven M. Penn and 5,216,616, issued Jun. 1, 1993 to William E. Masters.

It is, however, a disadvantage of such prior apparatuses and methods that the size of an object formed in this way on a forming surface or in a container is limited by the size of the forming surface or container itself. Therefore, these prior methods and apparatuses are suitable only for the manufacturer of relatively small objects.

BRIEF SUMMARY OF THE INVENTION

According to the present invention, a method of forming an object comprises the steps of depositing a flowable material onto an area of a forming surface to form a deposit, causing the deposit to at least partially harden on the forming surface to form a first portion of the object and then displacing the forming surface laterally relative to said portion so as to expose at least a part of the area. Further material is then deposited onto the exposed area to form a second portion laterally continuous with the first portion, and these steps are repeated until the object has been formed.

The flowable material, which may e.g. be a fluid or a granular material, may be deposited by spraying from a spray nozzle or by extrusion from an extrusion head, and the forming surface can be connected to the nozzle or head so as to move therewith during the formation of the object.

BRIEF DESCRIPTION OF THE DRAWINGS

The invention will be more readily understood from the following description thereof when taken in conjunction with the accompanying drawings, in which:

FIG. 1A shows a modification of the machine of FIG. 1;

DESCRIPTION OF THE PREFERRED EMBODIMENTS

Figure 1:
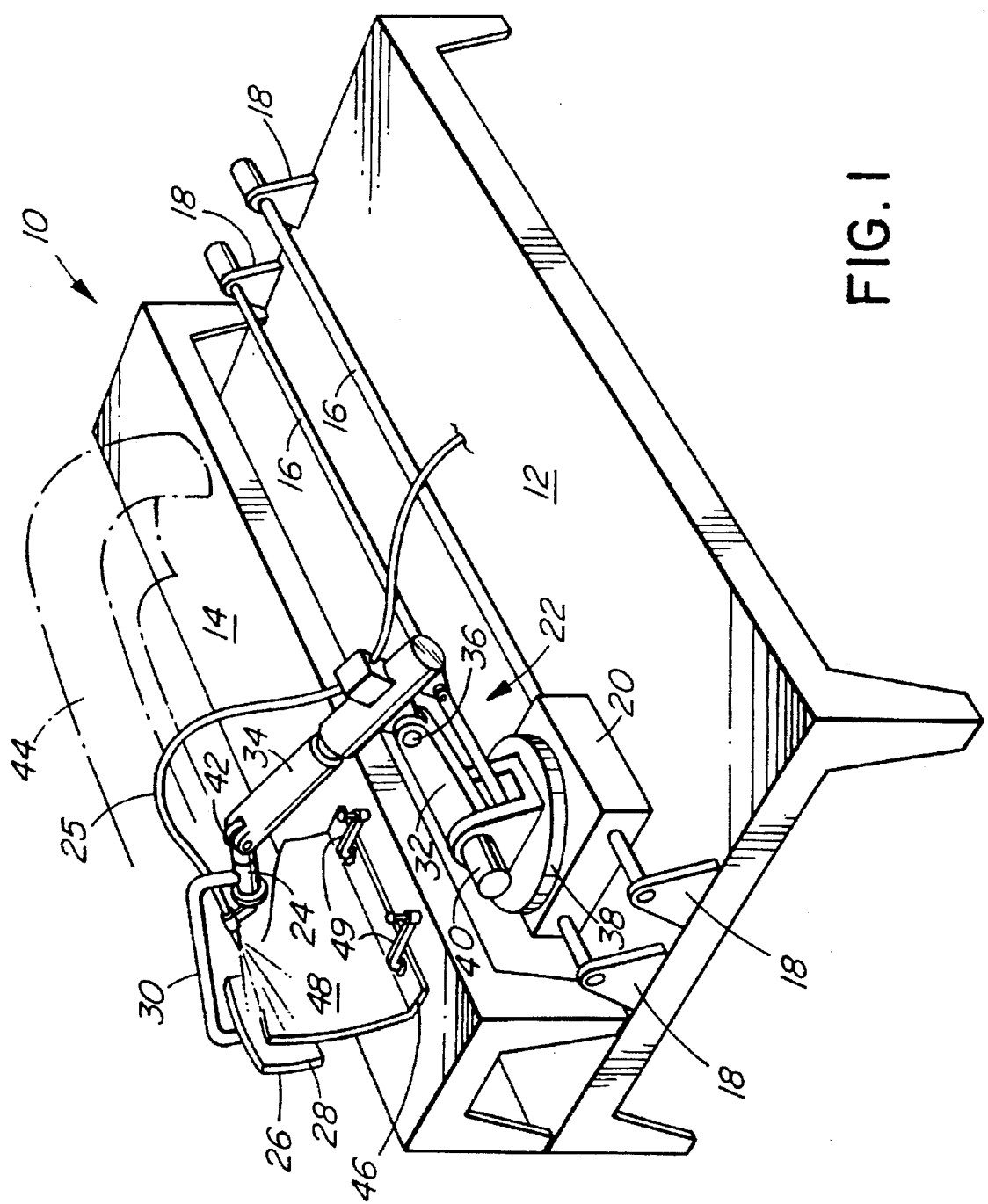
FIG. 1 shows a view in perspective of a fabrication machine according to a first embodiment of the present invention.

Referring firstly to FIG. 1 of the accompanying drawings, there is shown a fabrication machine indicated generally by reference numeral 10, which has a base table 12 and a further table 14 mounted on the table 12.

A pair of guide rails 16 extend across the table 12 and are supported in mutually parallel relationship, and at a spacing above the top surface of the table 12, by support brackets 18. A slide 20 is movable to and fro along the guide bars 16, and carries a manipulator indicated generally by reference numeral 22, which is a commercially suitable robotic manipulator.

The manipulator 22 carries a spray head 24 and a target plate 26, which has a forming surface 28 facing towards the spray head 24, the target plate 26 being connected to the spray head 24 by means of a support bar 30.

The manipulator 22 comprises a pair of arms 32 and 34 which are pivotally connected to one another by a pivot connection 36. The arm 32 is also pivotally connected to a pedestal 38 by means of a pivotal connection 40, and the arm 34 is pivotally connected to the spray head 24 by a pivotal connection 42. The pivotal connections 36, 40 and 42 allow the position and orientation of the spray head 24 and, therewith, the target plate 26 to be varied under the control of a computer program for forming an object, which is partially illustrated in chain-dot lines and indicated generally by reference numeral 44.

To form the object 44, hardenable sprayable material is discharged in the form of a spray from the spray head 24 to deposit the material as a retaining deposit in the form of a strip 46 on the top surface of the table 14, which forms a support. The strip 46 is clamped to the table 14 by clamps 49. The spraying of the flowable material is then continued to form a first deposit of the material on the forming surface 28, and the spray head 24 and the target plate 26 therewith, are displaced relative to the already deposited material. More particularly, the material is discharged onto an area of the forming surface 28 and is allowed to harden on this area to form a first portion of the object. When the material has hardened, the target plate 26 is slid laterally relative to the hardened material so as to re-expose the same area of the forming surface 28, so that further material can be discharged from the spray head 24 onto this forming surface area to form a second deposit laterally contiguous with and in one piece with the hardened first deposit and, thus, to form a second portion of the object. In this way, a part 48 of the object is formed. This process is then continued until the entire object has been formed.

In the present embodiment of the invention, the sprayable material comprises a glass fiber polyester material such as that employed previously for the production of e.g. fibreglass boats and car parts. The spray head 24 is part of a commercially available spray gun system, known as a chopper gun, which has two tubes (not shown) extending along a flexible conduit 25 connected to the spray head 24. One of these tubes supplies to the spray head 24 a polyester resin containing a catalyst, which the other supplies a polyester resin containing a promoter. The resins are sprayed simultaneously from the spray head 24 and, as they mix, a chemical reaction causes the resins to heat up and harden. A long glass fiber strand is also fed to the spray head 24, where it is chopped into short lengths which are deposited with the resins and reinforce the deposited material.

Other suitable sprayable materials may alternatively be employed. For example, a hot melt glue which hardens on cooling, or a concrete, for example Gunite, which can support itself while it cures, may be employed. When concrete is employed, the concrete may firstly be deposited onto the ground or a foundation, which may e.g. be provided with anchor bolts or other anchors, to form a retaining deposit, instead of on the table 14 of FIG. 1.

FIG. 1A shows a modification of the apparatus of FIG. 1 and, for convenience, like reference numerals have been employed in both of FIGS. 1 and 1A to indicate like parts.

The modification of FIG. 1A differs from the apparatus of FIG. 1 in that the support bar 30 of the latter has been replaced in the former by a flexible support indicated generally by reference numeral 31.

The support 31 comprises a link 33 pivotally connected to the manipulator arm 33, a link 35 connected to the target plate 26 and a pair of intermediate links 37 and 39, which are pivotally connected to one anther and to the links 33 and 35 by pivot joints 41, 43 and 45, as shown.

Also, in this embodiment the spray head 24 is connected to the manipulator arm 34 by a joint 47 which provides wrist-action movement of the spray head 24 relative to the arm 34. The joints 41, 43, 45 and 47 are robotic computer controlled joints for varying the orientation of the target plate 26 relative to the spray head 24 and, thus, for correspondingly varying the shape of the article 44.

Figure 2:
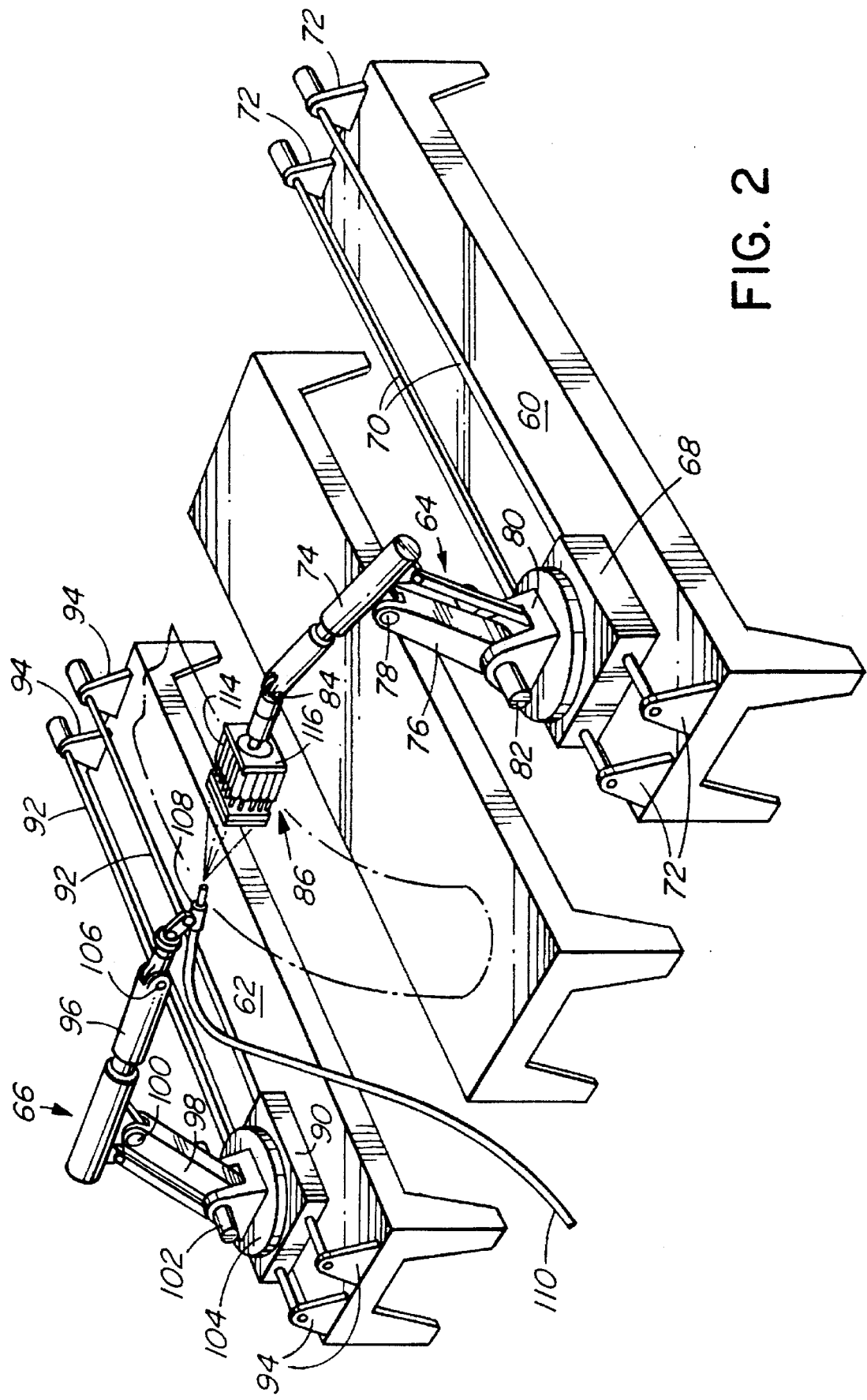
FIG. 2 shows a view in perspective of a fabrication machine according to a second embodiment of the present invention.

FIG. 2 shows a different forming machine, which comprises two elongate parallel support tables 60 and 62, which carry respective robotic manipulators indicated generally by reference numerals 64 and 66.

The manipulator 64 is mounted on a slide 68, which is slidable to and fro, along the length of the table 60, on a pair of parallel support bars 70, which are mounted at their opposite ends in support brackets 72 extending upwardly from the top surface of the table 60. The manipulator 64 comprises a pair of arms 74 and 76 which are connected to one another by a pivot connection 78. The arm 76 is pivotally connected to a pedestal 80 by a pivot connection 82, while the arm 74 is pivotally connected by a pivot connection 84 to a forming head 86, which is described in greater detail below.

The manipulator 66 is mounted on a slide 90, which is movable to and fro along a pair of parallel guide rods 92 supported, at opposite ends, by support brackets 94, which project upwardly from the top of the table 62.

The manipulator 66 comprises arms 96 and 98, which are connected to one another by a pivot connection 100. The arm 98 is connected by a pivot connection 102 to a pedestal 104, while the arm 96 is connected by pivot connection 106 to a spray head 108, to which a supply tube 110 is connected.

Figure 3:
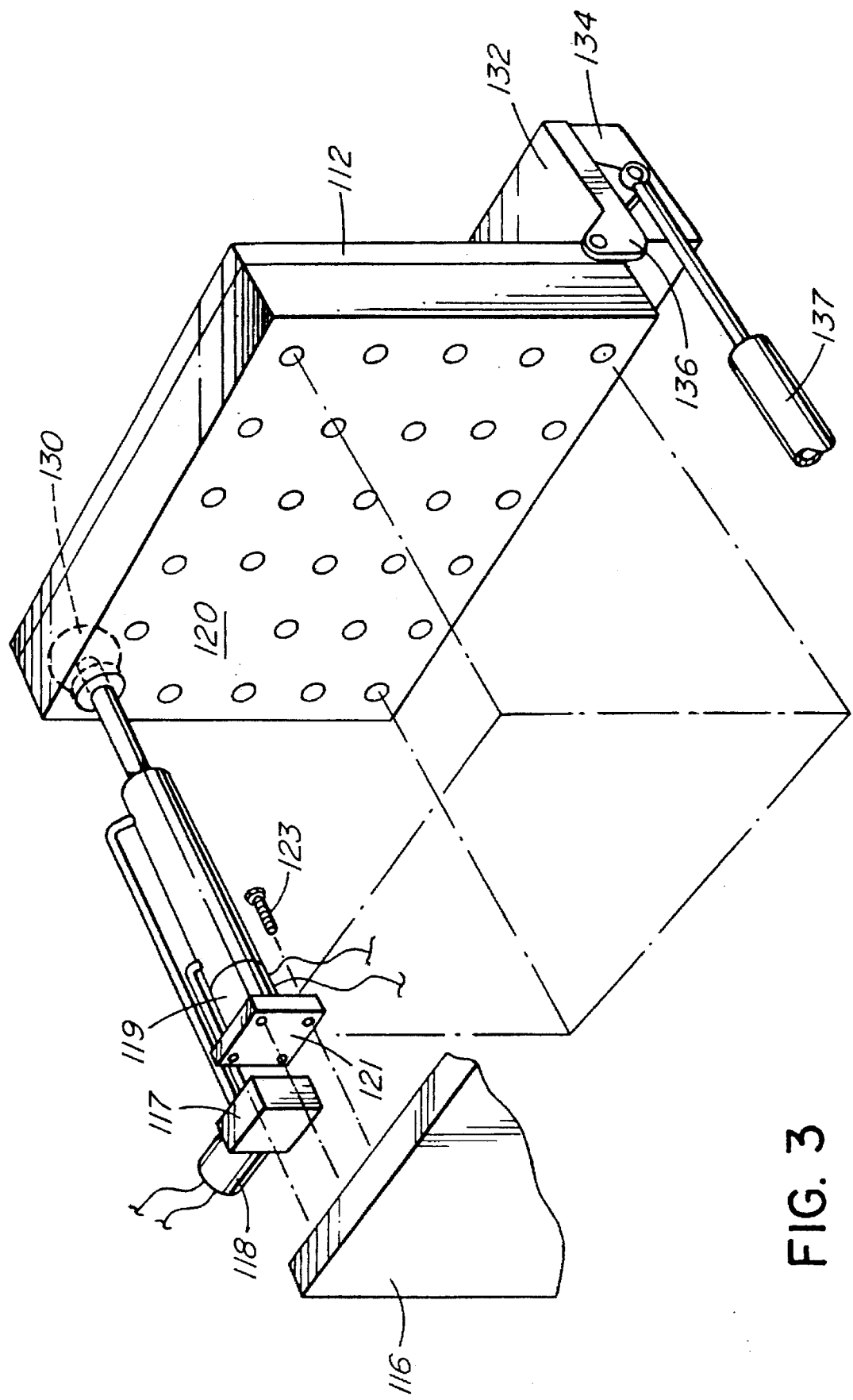
FIG. 3 shows a view in perspective of parts of the machine of FIG. 2.

Referring now to FIG. 3, the forming head 86 has a target plate 112 which is made of a resilient material and which is deformable in shape, during the formation of the object, so as to enable the shape of the object to be correspondingly varied during the formation of the latter.

For this purpose, a plurality of piston and cylinder devices 114, which in the present embodiment are pneumatic but which may be replaced by hydraulic piston and cylinder devices and only one of which is illustrated in FIG. 3, are connected between the rear side of the target plate 112 and a support plate 116 (FIG. 2). For convenience of illustration, only a single one of the piston and cylinder devices 114 is shown in FIG. 3. Each piston and cylinder device is provided with a valve 117, actuated by a solenoid 118, for controlling the extension and retraction of the piston and cylinder device, and also with an electronic position encoder 119, which feeds back to a computer (not shown) data representing the position of the respective piston. The piston and cylinder devices 114 are each mounted on a plate 121 which is secured by bolts, one of which is shown and is indicated by reference numeral 123, to the plate 116. Also, the piston and cylinder devices 114 are connected to the rear of the target plate 112 by being glued or vulcanized to a resilient backing 120. More particularly, each piston and cylinder device has, at one end thereof, a steel ball 130 which is embedded in the resilient backing 120. By extension and retraction of the piston and cylinder devices 114, the shape of the target plate 112, and thus of the forming surface on the from of the target plate 112, can be varied, as desired, in order to correspondingly vary the shape of the object being formed.

The piston and cylinder devices could be replaced by ball screws with electric motors or another computer controlled positioning system.

A bottom portion 132 of the target plate 112, which is made of resilient material, is secured to a backing extension 134 separate from the backing 120, and a hinge 136 pivotally secures the backing extension 134 to the lower edge of the backing 120. A piston and cylinder device 137, which is pivotally connected to the backing extension 134, is extensible and retractable for pivoting the bottom portion 132 of the target plate 112 between a horizontally extending position, in which is shown in FIG. 3, and a vertical position (not shown) in which it is aligned with the rest of the target plate 112, and thus for correspondingly varying the shape of the object being formed.

Instead of employing a single forming surface, as in the embodiment of FIG. 1, or a forming surface having a variable shape, as in the embodiment of FIG. 2, it is alternatively possible to employ a plurality of forming surfaces which may be indexed so as to be employed one at a time to receive the deposited material.

Figure 4:
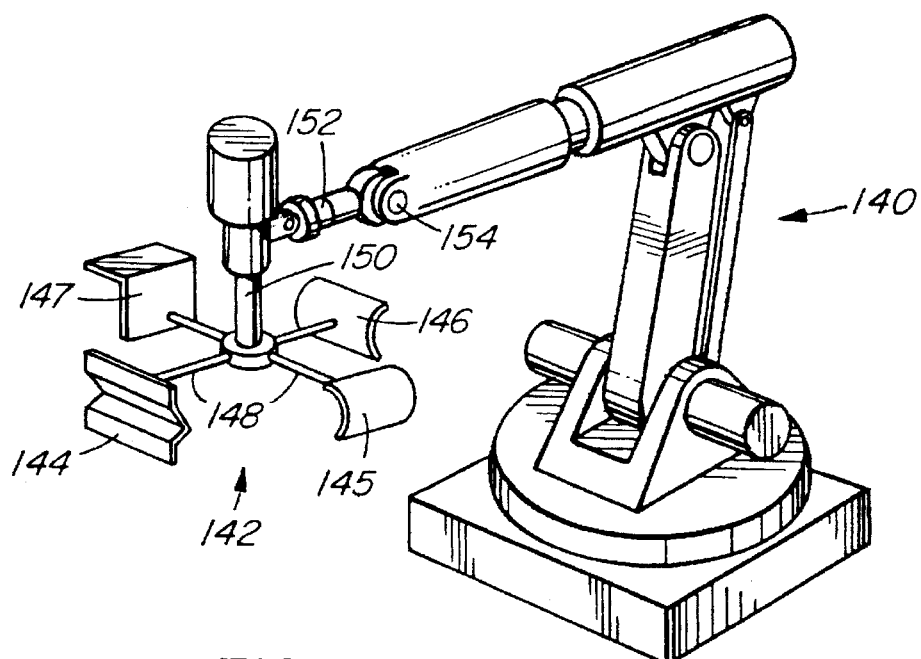
FIG. 4 shows a view in perspective of a third fabrication machine according to the present invention.

More particularly, as shown in FIG. 4, a manipulator indicated generally by reference numeral 140, which may for example be substituted for the manipulator 64 of FIG. 2, carries a forming member array indicated generally by reference numeral 142. The array 142 comprises four different forming members 144 through 147, which are carried on arms 148 extending radially outwardly from the bottom of a shaft 150. The shaft 150 extends downwardly from a support 152 which is pivotally connected, by a pivot connection 154, to the manipulator 140. The shaft 150 is mounted on the support 152 so as to be rotatable about its vertical axis by means of an indexing motor 155. Thus, the forming members 144 through 147 can be moved one at a time into an operative position for receiving the discharged flowable material.

To counteract adherence of the deposited flowable material to the forming surface, the forming surface is preferably provided with a non-stick layer of material, such as polytetrafluoroethylene.

Figure 5:
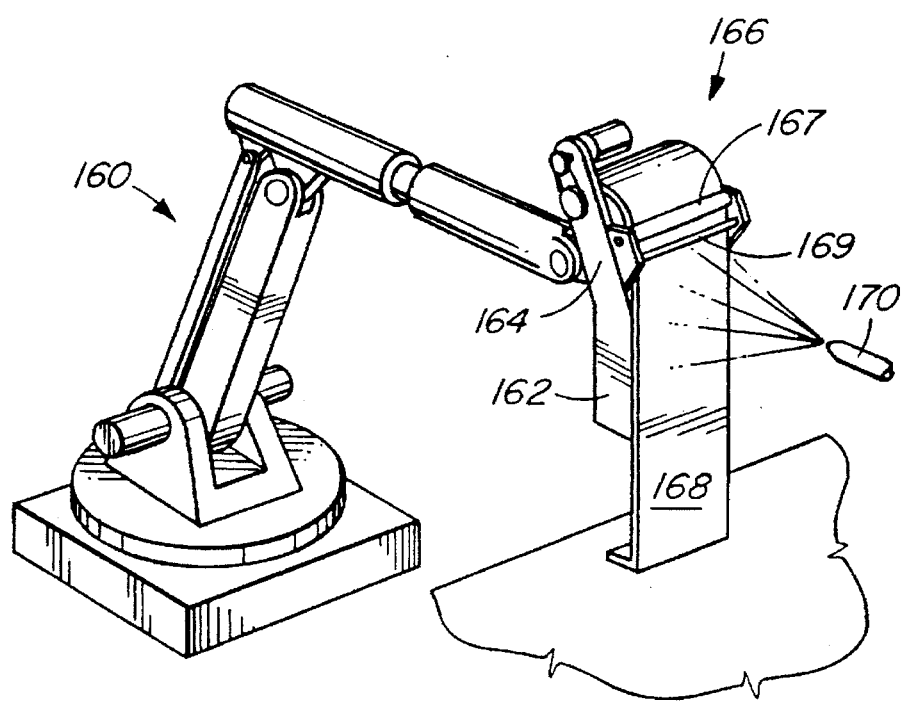
FIG. 5 shows a view in perspective of a fourth fabrication machine embodying the present invention.

A different method of counteracting adherence of the flowable material to the forming surface is illustrated in FIG. 5, in which there is shown a manipulator indicated generally by reference numeral 160, which carries a forming member 162, provided with a forming surface. The forming member 162 has a side plate 164 which extends upwardly at the top of the forming member 162 so as to support a roll, indicated generally by reference numeral 166, of sheet material 168. The sheet material 168 can be unwound from the roll 166 by means of a feed roll 167 so as to cover the forming surface and, thus, so as to be interposed between the forming surface and a spray head 170 employed to deposit the flowable material. The flowable material is therefore deposited onto the sheet material, instead of being deposited directly onto the forming surface, and the sheet material is unwound from the roll 166 as the spray head 170 and the forming member 162 are moved during the formation of the object. The sheet material 168 may be severed from the roll 166 by a cutter blade 169. Alternatively, the sheet material could be stretched between supports and kept stationary throughout the process.

Figure 6:
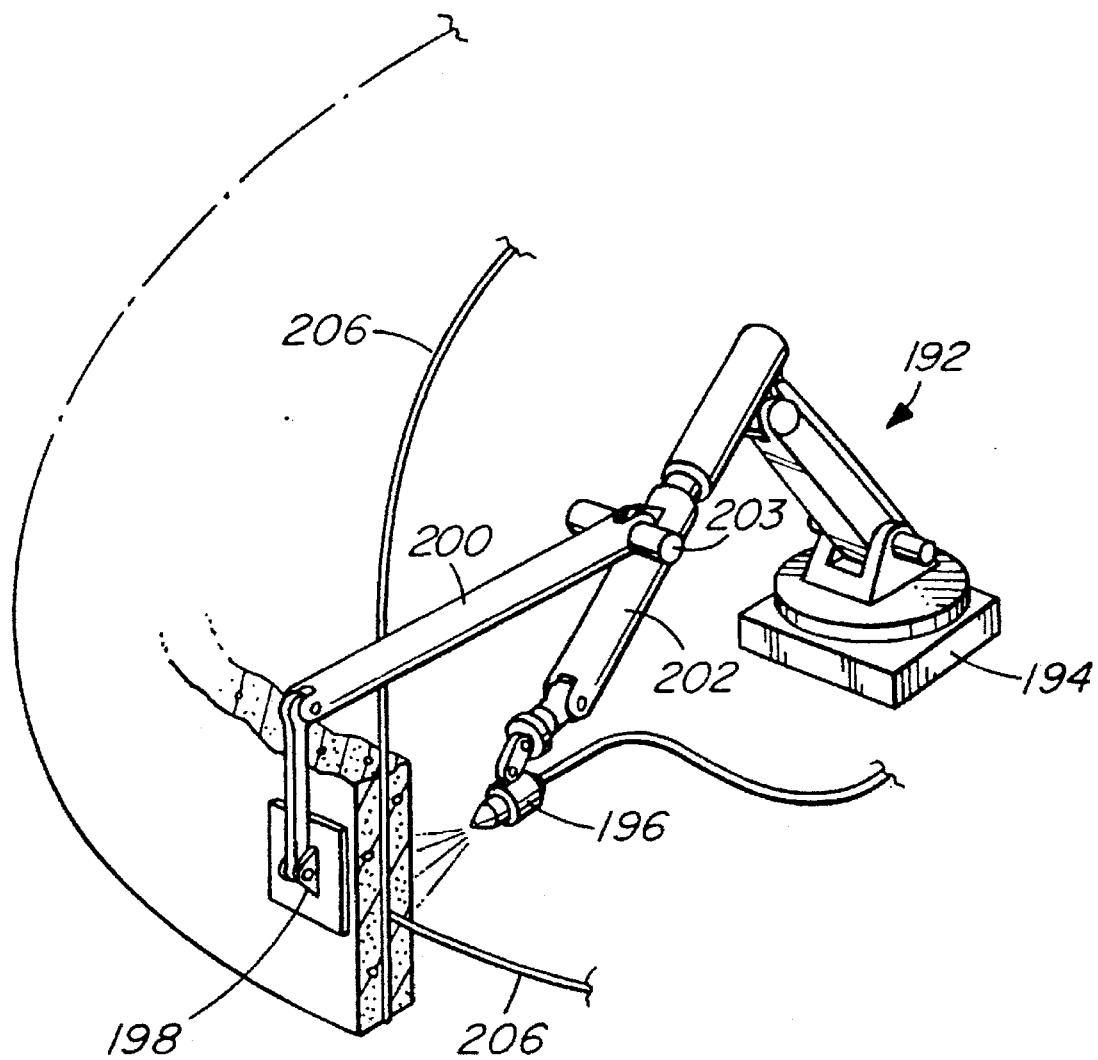
FIG. 6 shows a view in perspective of a fifth fabricating machine embodying the present invention.

FIG. 6 shows a further embodiment of the invention which employs a manipulator indicated generally by reference numeral 192, mounted on a base 194 and carrying a spray head 196.

The manipulator 192 has a pair of arms 200 and 202, which are pivotally connected to one another and also to the target plate 198 and the spray head 196, respectively. A robotic joint 203 between the arms 200 and 202 allows the arm 200 and therewith the target plate 198 to be adjusted in position relative to the spray head 196.

During the formation of an object, which in the present case is indicated generally by reference numeral 208, flowable material sprayed from the spray head 196 onto the target plate 198 embeds therein reinforcement rods 206 which, thus, serve as reinforcement in the object 208. The arm 202 is displaced along the rods 206 during the formation of the object and in this case the flowable material may be concrete, which is self-supporting between the rolls 206 while the concrete cures.

As will be apparent to those skilled in the art, various modifications may be made to the above described embodiments of the present invention within the scope and spirit of the appended claims.

For example, whereas the above-described embodiments of the invention employ spray heads for depositing the flowable material in the form of a spray onto the forming surface, it is alternatively possible to deposit the material onto the forming surface by extrusion from an extrusion head.

Also, adhesion of the deposited material to the forming surface could be counteracted by making the forming plate of a porous material having a non-porous layer at its side opposite from the forming surface, or with a small tank or other container at the side of the target plate opposite from the forming surface. A fluid, for example oil, or possibly air or water, is then pumped through the target plate so that it constantly oozes from the forming surface, and so that the deposited material is therefore deposited onto a layer of this fluid. The temperatures of the target plate, the fluid and the fluent material can be controlled to facilitate non-adherence of the deposited material to the forming surface and to expedite the hardening of the deposited material.

I claim:

1. A method of forming an object, which comprises the steps of:

depositing a hardenable flowable material onto an exposed area of a forming surface;

causing said deposited material to at least partially harden on said forming surface to form a portion of said object;

effecting relative sliding movement of said forming surface and said at least partially hardened portion laterally of said area so as to re-expose said area of said forming surface;

depositing further hardenable flowable material onto the re-exposed area of said forming surface to form a further portion of said object laterally contiguous with and in one piece with the at least partially hardened portion; and repeating the above steps with said object has been formed.

2. A method as claimed in claim 1, which includes discharging the fluid material from a discharge head and displacing said discharge head together with the forming surface to form the object.

3. A method as claimed in claim 1, wherein the step of depositing the material onto said forming surface includes embedding a reinforcement in the material.

4. A method as claimed in claim 1, which includes varying the shape of said forming surface during the formation of the object.

5. A method as claimed in claim 4, which includes employing a resilient material to form said forming surface, and wherein the step of varying of the shape of said forming surface comprises flexing said resilient material.

6. A method as claimed in claim 5, wherein the step of flexing said resilient material is effected by operation of a plurality of piston and cylinder devices acting on said resilient material.

7. A method as claimed in claim 1, which includes replacing said forming surface with a differently-shaped further forming surface during the formation of the object.

8. A method as claimed in claim 1, which includes providing an intermediate layer of material between said flowable material and said forming surface during the depositing of said flowable material to prevent adherence of said flowable material to said forming surface.

9. A method as claimed in claim 8, which includes feeding said intermediate layer of material from a supply to said forming surface during the displacement of said forming surface relative to said portion of the object.

10. A method of forming an object by spraying a sprayable material onto a forming surface which comprises the steps of:

directing a spray of said sprayable material onto said forming surface to form a first deposit of said sprayable material on an area of said forming surface;

causing said first deposit to at least partially harden on said forming surface so as to form a first portion of said object until the object is formed;

causing relative movement of said forming surface and said deposit so as to at least partially expose said area of said forming surface;

spraying a further amount of said sprayable material onto said area to form a second deposit of said sprayable material continuous with said first deposit;

causing said second deposit to harden on said forming surface so as to form a second portion of said object in one piece with said first position; and repeating the above steps to form further portions of said object.

11. A method as claimed in claim 10, which includes, prior to step of directing a spray of said sprayable material onto said forming surface, the steps of spraying the sprayable material onto a support to form a retaining deposit and causing said retaining deposit to be secured to said support, the steps of spraying and hardening said first deposit on said forming surface comprising forming said first deposit as one piece with said retaining deposit, said method further comprising employing said retaining deposit to retain said first deposit against movement during said relative movement of said forming surface and said first deposit.

12. A method as claimed in claim 11, which includes clamping said retaining deposit to said support.

13. A method as claimed in claim 10, which includes varying the direction in which said sprayable material is sprayed during the spraying of said sprayable material onto said forming surface.

14. A method as claimed in claim 10, in which the step of spraying said sprayable material comprises discharging said sprayable material from a spray head, said method including the steps of moving said spray head and supporting said forming surface from said spray head for movement therewith.

15. A method as claimed in claim 14, which includes varying the orientation of said forming surface relative to said spray head during the formation of said object.

16. A method as claimed in claim 10, wherein the step of spraying said sprayable material comprises discharging said sprayable material from a spray head, said method further including the step of varying the position of said forming surface relative to said spray head to correspondingly affect the shape of said object.

17. A method as claimed in claim 16, wherein the step of varying the position of said forming surface comprises varying the shape of said forming surface.

18. A method as claimed in claim 10, which includes employing a plurality of piston and cylinder devices to vary the shape of said forming surfaces during the formation of said object.

19. A method as claimed in claim 10, which includes replacing said forming surface by a differently-shaped forming surface during the formation of said object so as to correspondingly affect the shape of said object.

20. A method as claimed in claim 10, which includes interposing a flexible sheet material between said forming surface and said deposits of said sprayable material to prevent adhesions of said sprayable material to said forming surface.

* * * * *